United States Patent Office 2,727,866
Patented Dec. 20, 1955

2,727,866

PHOSPHOR CONTAINING GALLIUM

Simon Larach, New Brunswick, N. J., assignor to Radio Corporation of America, a corporation of Delaware No Drawing. Application May 28, 1953,
Serial No. 358,189

10 Claims. (Cl. 252—301.6)

This invention relates to luminescent materials and, more particularly, to improved red-emitting cathodoluminescent phosphors containing gallium, and to methods of preparation of the improved phosphors.

Red-emitting cathodoluminescent phosphors are finding great utility as the red phosphor component in kinescopes for color television. One of the most effective groups of red emitters are the zinc and zinc-cadmium selenides containing a copper activator and a halide additive. However, the best reported peak emission intensity of this type phosphor is only about 40 as compared to an emission intensity of 100 for rhombohedral manganese activated zinc silicate.

It has been demonstrated that gallium may be substituted for part or preferably all of the halide additive. Such a substitution does not materially increase the peak emission intensity, but instead decreases the fluorescence and increases the phosphorescence of the phosphor to produce a phosphor with a long decay period. It is also well known that it is difficult to incorporate both a halide and gallium into a phosphor by ordinary methods. Gallium in the presence of a halide forms materials which volatilize during the crystallization of the phosphor.

It is an object of this invention to provide red-emitting cathodoluminescent phosphors having a high peak emission intensity.

Another object of this invention is to provide copper-activated zinc and zinc-cadmium selenide phosphors having halide and gallium additives incorporated.

It is a further object of this invention to provide an improved method for preparing a red-emitting cathodoluminescent phosphor having a high peak emission intensity.

In general, the present invention comprises the incorporation of activator quantities of copper, gallium and a halide, selected from the group consisting of chlorides, bromides and iodides, into a phosphor consisting essentially of a selenide of at least one metal selected from the class consisting of zinc and cadmium. The method of the present invention comprises firing, to about 900° C. for about 30 minutes, at least one selenide selected from the class consisting of zinc and cadmium with activator quantities of gallium and copper; and then refiring the resultant product to about 900° C. for about 30 minutes with a small quantity of a halogen containing compound.

EXAMPLE

Mix 100 grams of pure zinc selenide with 0.01 gram of copper as the nitrate and 0.01 gram of gallium as the nitrate. To facilitate mixing, the constituents may be slurried with water. The mixture is dried to about 150° C., transferred to a silica firing vessel, and fired at about 900° C. for about 30 minutes in an atmosphere of nitrogen. When the product has cooled, it is mixed with 2 grams of ammonium chloride and the mixture is fired in a silica vessel to about 900° C. for about 30 minutes in an atmosphere of nitrogen. The product has a red cathodoluminescent emission, and a spectral distribution that is about the same as for copper activated zinc selenide; however, there is an increase in emission intensity of about 75% over copper activated zinc selenide. The product has a very strong fluorescence with a fast power-law-type decay.

The table shows the effect of various additives on the peak wavelength and relative peak emission intensity of some zinc selenide phosphors under cathode ray excitation. The relative peak emission intensity is relative to rhombohedral manganese activated zinc silicate considered to be 100. All metallic additions were 0.01% by weight as the nitrate. Chloride additions were 2.0% by weight as ammonium chloride. Chloride additions made in the presence of aluminum or gallium additions were made by the method of the invention.

Table.—Effect of various additives on zinc selenide phosphors

| Activator | Additives | Peak Wavelength, A. | Relative Peak Emission Intensity |
|---|---|---|---|
| None | None | 6,370 | 0.31 |
| Do | Ga | (¹) | (¹) |
| Do | Cl | 6,020 | 2.0 |
| Do | Al | 6,100 | 0.2 |
| Do | Al and Cl | 6,370 | 0.7 |
| Cu | None | 6,500 | 9.4 |
| Cu | Cl | 6,470 | 23.0 |
| Cu | Al | 6,470 | 4.5 |
| Cu | Al and Cl | 6,500 | 11.0 |
| Cu | Ga | 6,470 | 37.0 |
| Cu | Ga and Cl | 6,470 | 70.0 |

¹ Emission too weak to measure.

The materials used to prepare the phosphors of this invention should be the purest materials obtainable, since small amounts of impurities affect the emission of the phosphor. The zinc selenide may be prepared by the method disclosed by S. M. Thomsen in Patent No. 2,534,562, issued December 19, 1952.

While copper and gallium were introduced as nitrates in the example, these cations may be introduced in other forms, for example as carbonates and sulphates. Copper additions may range from 0.002 to 0.05%; the preferred addition being 0.01%. Gallium additions may range from 0.005 to 0.05%; the preferred addition being 0.01%. The halide may be a chloride, bromide or iodide and may be introduced as ammonium salts or as the salt of an alkali metal or an alkaline earth metal. Halide additions may range from 0.2 to 10.0%; the preferred addition being 2.0%. Cadmium may be substituted for part or all of the zinc in the above-described example. Increasing substitutions of cadmium for zinc shifts the emission characteristics of the product toward the longer wavelength end of the spectrum. The furnace atmosphere should be neutral, in that it should not react with any of the constituents. Nitrogen, helium and argon are recommended atmospheres.

There has thus been described a new series of improved, red-emitting copper-activated zinc-cadmium selenides containing gallium and a halide; and a new and improved method for preparing these phosphors.

What is claimed is:

1. A method of preparing a phosphor material which comprises mixing activator quantities of gallium and copper salts with a selenide of at least one metal selected from the class consisting of zinc and cadmium, firing said mixture at about 900° C. for about 30 minutes in a neutral atmosphere, mixing said fired product with activator quantities of a halide selected from the group consisting of iodides, bromides and chlorides, and firing the resultant mixture to about 900° C. for about 30 minutes in a neutral atmosphere.

2. The method of claim 1 wherein said gallium and copper salts are nitrates and said halide is ammonium chloride.

3. The method of claim 1 wherein said metal is zinc.

4. A method of preparing a red-emitting phosphor material which comprises mixing activator quantities of gallium nitrate and copper nitrate with pure zinc selenide, firing said mixture to about 900° C. for about 30 minutes in an atmosphere of nitrogen, cooling said fired product, mixing said fired product with an activator quantity of ammonium chloride, and firing said resultant mixture to about 900° C. for about 30 minutes in an atmosphere of nitrogen.

5. A method of preparing a red-emitting phosphor material which comprising mixing about 0.01% of gallium as the nitrate and about 0.01% copper as the nitrate with pure zinc selenide, firing said mixture to about 900° C. for about 30 minutes in an atmosphere of nitrogen, cooling the fired product, mixing said fired product with about 2.0% of ammonium chloride, and firing the resultant mixture to about 900° C. for about 30 minutes in an atmosphere of nitrogen.

6. A phosphor material consisting essentially of the reaction product obtained by firing, to about 900° C. for about 30 minutes in a neutral atmosphere, at least one selenide selected from the class consisting of zinc selenide and cadmium selenide, with activator quantities of gallium and copper salts; and then refiring, to about 900° C. for about 30 minutes in a neutral atmosphere, the resultant product with activator quantities of a halide selected from the group consisting of iodide, bromide and chloride.

7. The phosphor of claim 5 wherein said gallium and copper salts are nitrates and said halide is ammonium chloride.

8. The phosphor of claim 2 wherein said selenide is zinc selenide.

9. A phosphor material consisting essentially of the reaction product obtained by firing pure zinc selenide with activator quantities of gallium nitrate and copper nitrate to about 900° C. for about 30 minutes in an atmosphere of nitrogen and then refiring the resultant product with an activator quantity of ammonium chloride to about 900° C. for about 30 minutes in an atmosphere of nitrogen.

10. A phosphor material consisting essentially of the reaction product obtained by firing pure zinc selenide with about 0.01% of gallium as the nitrate and about 0.01% of copper as the nitrate to about 900° C. for about 30 minutes in an atmosphere of nitrogen and then refiring the resultant product with about 2.0% of ammonium chloride to about 900° C. for about 30 minutes in an atmosphere of nitrogen.

References Cited in the file of this patent

UNITED STATES PATENTS 2,623,859    Kroger _____ Dec. 30, 1952